United States Patent [19]

Trozzi

[11] Patent Number: 4,966,471
[45] Date of Patent: Oct. 30, 1990

[54] TRUNNION BEARING DUST SEAL

[75] Inventor: Norman K. Trozzi, Caldwell, N.J.

[73] Assignee: Foster Wheeler Energy Corporation, Clinton, N.J.

[21] Appl. No.: 461,725

[22] Filed: Jan. 8, 1990

[51] Int. Cl.⁵ ............................................. F16C 33/74
[52] U.S. Cl. ..................................... 384/151; 384/408; 277/147
[58] Field of Search ............... 384/151, 477, 408, 410, 384/413; 277/75, 147, 151, 230, 220, DIG. 4, 174, 153

[56] References Cited

U.S. PATENT DOCUMENTS

| | | |
|---|---|---|
| 1,903,166 | 8/1931 | Bryant . |
| 1,946,511 | 10/1931 | Van Pelt . |
| 3,087,734 | 4/1963 | Klinger .......................... 277/DIG. 4 |
| 3,401,893 | 9/1968 | Reynolds . |
| 3,745,391 | 7/1973 | Dochterman ....................... 384/408 |
| 3,746,268 | 7/1973 | Kastrinos . |
| 3,940,189 | 2/1976 | Renk et al. ........................... 384/408 |
| 4,181,263 | 1/1980 | Stevens . |
| 4,200,345 | 4/1980 | Walker ................................ 384/151 |

Primary Examiner—Lenard A. Footland
Attorney, Agent, or Firm—Marvin A. Naigur

[57] ABSTRACT

A seal assembly for a rotating drum in which a trunnion is secured relative to the drum for rotation therewith and is supported by a bearing assembly. At least one seal ring engages a shoulder of the trunnion in an area adjacent to the bearing surfaces of the trunnion and the bearing assembly. The seal ring is laterally held loosely in place by at least one retaining ring and is biased against the trunnion by a spring loaded cable. A lubricant is injected between the trunnion and the bearing assembly and collects in at least one reservoir. The lubricant is absorbed by the seal ring from the reservoir through a wick.

19 Claims, 2 Drawing Sheets

TRUNNION BEARING DUST SEAL

FIELD OF THE INVENTION

The present invention relates in general to the sealing of bearings or other rotating members. More particularly, the present invention provides a sealing assembly to prevent dust infiltration to the trunnion bearing surfaces of a ball mill pulverize assembly.

BACKGROUND OF THE INVENTION

In the operation of any type of plant using pulverized coal for fuel, it is common practice to supply raw coal to a ball mill pulverizer to reduce the size of the coal and mix it with air. The main component of the typical ball mill is a large drum with hollow trunnions at each end forming an extension of the drum and providing space for introduction of the raw coal to the mill. The trunnions also define a bearing surface for permitting rotation of the drum. The drum is filled with a charge of forged steel balls to a level just below the bottom of the trunnions. As the drum is rotated, the balls are continuously lifted and tumbled by gravity onto the coal to pulverize the coal. Classifiers are usually located at each end of the mill and serve as separators, so that as the pulverized coal is passed from the grinding zone of the mill to the pulverizer, and oversized particles are rejected by gravity separation in a low velocity central section of the classifier and by centrifugal separation. The rejected material is mixed with the incoming raw coal feed and returned through the trunnion by screw conveyors for further grinding.

Rotation of the drum and trunnions generates frictional forces between the bearing surfaces of the trunnions and associated bearing assemblies which can significantly reduce the efficiency of operation of the system and lead to excessive wear of components. Many ball mill pulverizer assemblies are therefore equipped with means for continuously lubricating the bearing surfaces. A problem with assemblies of this type is that coal dust or other foreign material can infiltrate the bearing surfaces and surrounding areas thereby contaminating the bearing lubricant. The coal dust acts like an abrasive and accelerates wear of the bearing surfaces, and further adversely affects the lubricant pumping system usually associated with assemblies of this type.

A fabric such as felt or similar material can be used to seal the area surrounding the bearing surfaces. However, adequate contact of the fabric in sealing engagement with the trunnion is often difficult to maintain in view of minor displacements of the sealing surface caused during rotation by asymmetry and precision of the trunnion, as well as thermal expansion and contraction of the mill, etc. Fabric seals will also dry, wear and deteriorate over an extended period of operation, resulting in failure of the seal.

SUMMARY OF THE INVENTION

It is therefore an object of the present invention to provide a seal assembly for a ball mill pulverizer which constitutes an improvement over the prior art seals.

It is a further object of the present invention to provide a seal assembly of the above type which utilizes a fabric seal member that engages the trunnion and is mounted in a manner to render the position of the seal member movable and adjustable to accommodate displacement of the trunnion during operation.

It is a still further object of the present invention to provide a seal assembly of the above type which extends the reliability and efficiency of the ball mill pulverizer.

It is still further object of the present invention to provide a seal assembly of the above type in which the seal member is permitted to absorb the lubricant to enhance the operation and reliability of the seal.

Toward the fulfillment of these and further objects, the seal assembly of the present invention includes at least one seal ring of felt or similar material fitted to engage a ball mill trunnion in the area adjacent to the mating bearing surfaces of the trunnion and a bearing assembly. The seal ring is held loosely in place by at least one retaining ring for lateral support thereof and is adjustably compressed against the trunnion at the periphery of the seal ring by a spring loaded cable. A lubricant which is injected between the mating bearing surfaces is collected in a reservoir adjacent thereto and recycled by a pump means for reinjection to the bearing surfaces. The lubricant within the reservoir is also absorbed by the seal ring through a wick connected to the seal ring. The wick is constructed of felt or similar material. In this manner, the seal ring is automatically lubricated and the operation thereof is improved without a need for external lubricating maintenance or attention.

BRIEF DESCRIPTION OF THE DRAWINGS

The above description, as well as further objects, features advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
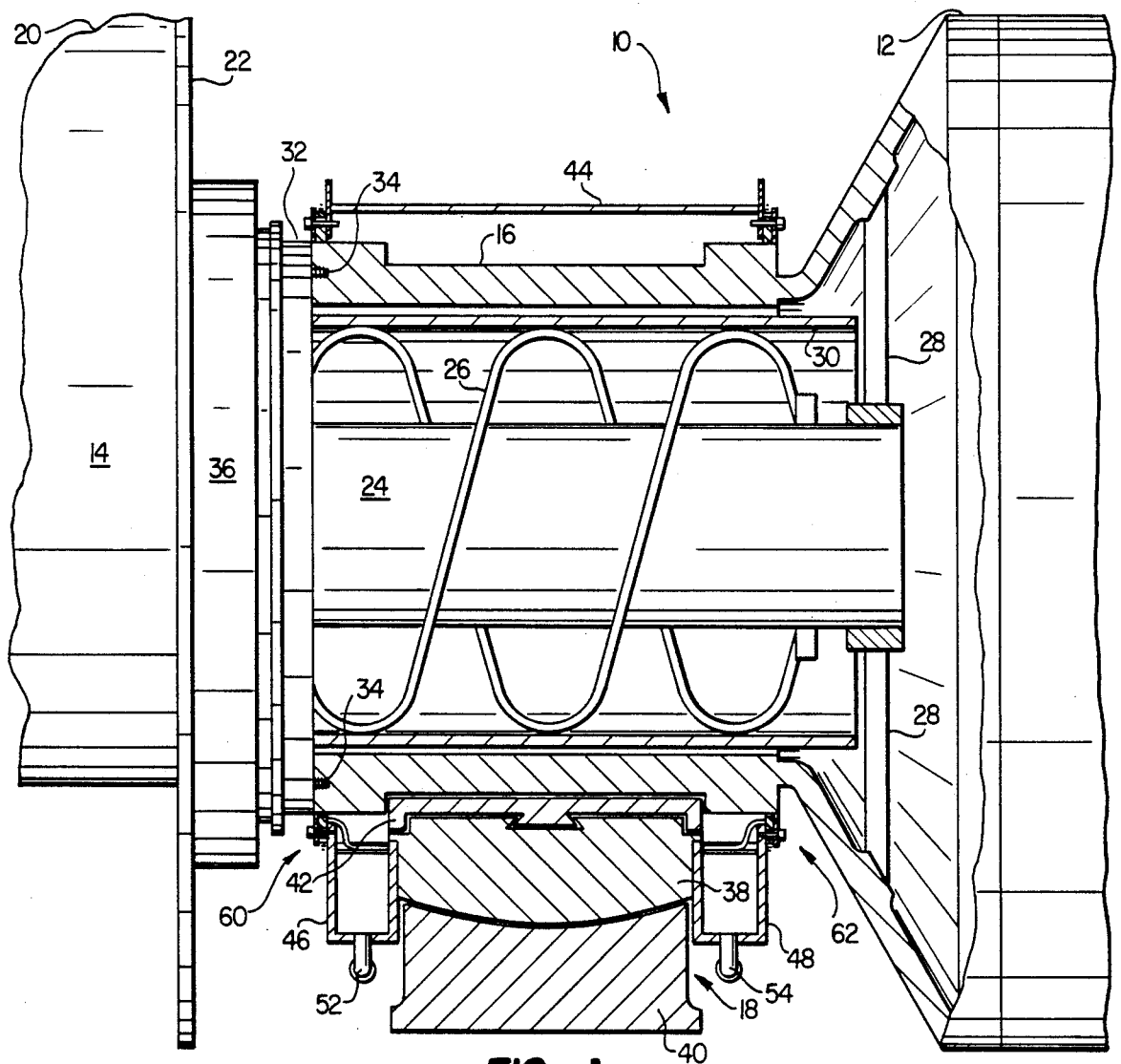
FIG. 1 is a partial front elevational view, partial sectional view, depicting the seal assembly of the present invention in association with a mill trunnion mounted between a particle coal classifier and mill drum.

Referring to FIG. 1 of the drawings, the reference numeral 10 refers to a ball mill pulverizer having a rotatable drum 12. The drum 12 is connected at each end thereof to a particle coal classifier 14 by a trunnion 16 rotatably supported on a bearing assembly 18. Only the left end of the drum 12 and its corresponding classifier 14 and trunnion 16 are shown in FIG. 1, it being understood that the right end of the drum includes a similar arrangement.

The classifier 14 includes a curved housing 20, which extends between a front plate 22 and a rear plate (not shown). Although not shown in the drawings, it is understood that the classifier 14 also includes an inlet pipe extending into the upper portion of the classifier 14 for introducing relatively course coal particles into the classifier, a hot air inlet pipe extending into the lower portion of the classifier for passing air into the drum 12, and an outlet pipe extending from the front plate 22 for discharging a mixture of crushed coal and air. A central air tube 24 is connected to the hot air inlet pipe of the classifier 14 and extends outwardly through an opening in the front plate 22 and into the drum 12 through a central portion of the trunnion 16. The central air tube 24 is supported by suitable means (also not shown) for rotation. A spiraled ribbon conveyor 26 extends around the air tube 24 for conveying coal through the classifier 14 in a left to right direction as the air tube rotates, as will be explained in greater detail. A plurality of drive spokes 28 extend from the end of the air tube 24 opposite the end that registers with the inlet pipe and are secured to the inner wall of the drum 12. Thus, rotation of the drum 12 causes corresponding rotation of the air tube 24 and the conveyor 26.

A stationary trunnion tube 30 is coaxially disposed inside the trunnion 16 and extends from the front plate 22 of the classifier 14 to an area just inside the drum 12. The outer diameter of the tube 30 is slightly less than the inner diameter of the trunnion 16 to define an annular space therebetween, for reasons to be described. A rotating ring 32 is bolted to the end of the trunnion 16 for rotation therewith by a plurality of angularly spaced bolts, two of which are shown by the reference numeral 34. The rotating ring 32 is connected by suitable seal means (not shown) to a sealing air housing 36 attached to the front plate 22 of the classifier 14. Sealing air is introduced into the housing 36 via an inlet pipe (not shown), and flows from the housing into and through the annular space between the trunnion 16 and the trunnion tube 30 for the purpose of preventing escape of the pressurized air and entrained relatively fine coal pulverized particles from the mill.

Although not shown in the drawings, it is understood that a conventional system for rotating the drum 12 is provided. For example, a large ring gear (not shown) can be mounted on the outside of the drum, which engages a drive gear mounted on a shaft driven by a motor. Thus, when the motor is activated, its rotation is translated through the shaft to the drive gear which, in turn, engages the ring gear, thereby rotating the drum 12 and therefore the trunnions 16 about their longitudinal axes. Since the aforementioned components are conventional, they are not shown in the drawings, nor will they be described in any further detail.

Thus, relatively coarse coal introduced into the classifier 14 falls to the bottom of the housing 20 just below the air tube 24. Rotation of the drum 12 causes corresponding rotation of the air tube 24, thus causing the ribbon conveyor 26 to drive the coal in a direction from left-to right through the classifier 14, the trunnion 16 and into the drum 12. A plurality of steel balls (not shown) are provided in the drum 12 and constantly move as the drum rotates, to act on the coal to crush or pulverize it. Air from the hot air inlet pipe of the classifier passes through the rotating air tube 24 and enters the drum 12 where it mixes with the crushed coal. The resulting mixture passes into the space between the upper portion of the air tube 24 and the trunnion tube 30 and the space between the air tube and the relatively coarse coal as the latter passes from the classifier 14 into the drum 12.

It is understood that the classifier contains a plurality of baffles (not shown) which function to separate particles that exceed a predetermined size from the mixture of air and relatively fine particles by centrifugal forces. This technique is conventional and is taught in U.S. Pat. No. 4,450,071 also assigned to the assignee of the present invention. The relatively coarse particles fall into the bottom of the classifier 14 for recycle back into the drum 12 under the action of the ribbon conveyor 26, while the mixture of air and relatively fine particles discharges from the classifier 14 via its outlet to a furnace or the like.

The bearing assembly 18 includes a self centering, lower ball casting 38 supported on a pedestal 40. Although not shown in the drawings, the pedestal 40 rests on a concrete foundation or the like. A babbit 42, which may be tin or a tin alloy, for example, is poured or machined in place on the lower ball casting 38 and engages the trunnion 16. The babbit 42 supports the trunnion 16 and conforms to irregularities in the surface of the trunnion during rotation. The babbit 42 and the casting 38 extend one hundred eighty degrees around the lower half of the trunnion 16. A bearing cap 44 is also provided which covers the top half of the trunnion 16.

A bearing lubricant is applied in a manner to be discussed to the babbit 42 between the trunnion 16 and the lower ball casting 38 in order to reduce the frictional forces generated during rotation of the trunnion. Reservoirs 46 and 48 are fastened to the lower ball casting 38 at each end thereof in any known manner and function to collect the lubricant. The reservoirs 46 and 48 extend on hundred eighty degrees around the lower half of the trunnion 16. As illustrated by arrows 50 in FIG. 2 (with respect to the reservoir 46), the lubricant passes, under the force of gravity, from a lower region of the babbit 42 into the reservoir. Although not shown, the lubricant passes in a similar manner into the reservoir 48. Return ports 52 and 54 (FIG. 1) extend respectively from the base of the reservoirs 46 and 48. As illustrated by arrow 55 in FIG. 2 with respect to the reservoir 46, the lubricant passes by gravity from the reservoirs 46, 48 into the return ports 52, 54. The return ports 52, 54 then direct the lubricant into conduits (not shown, but schematically illustrated by lines 56 in FIG. 3 with respect to the return port 52). A fluid pump 58 (FIG. 3) forces the lubricant through the latter conduits and injects it between the trunnion 16 and the casting 38 at an upper portion of the babbit 42.

According to the present invention, two seal assemblies, shown in general in FIG. 1 by the reference numerals 60 and 62, are provided for preventing contamination of the bearing lubricant and the bearing surfaces of the trunnion 16, the babbit 42 and the lower ball casting 38 by coal dust or other foreign material. Since the seal assemblies 60 and 62 are substantially the same, only the seal assembly 60 will be described as illustrated in FIGS. 2 and 3.

Figure 2:
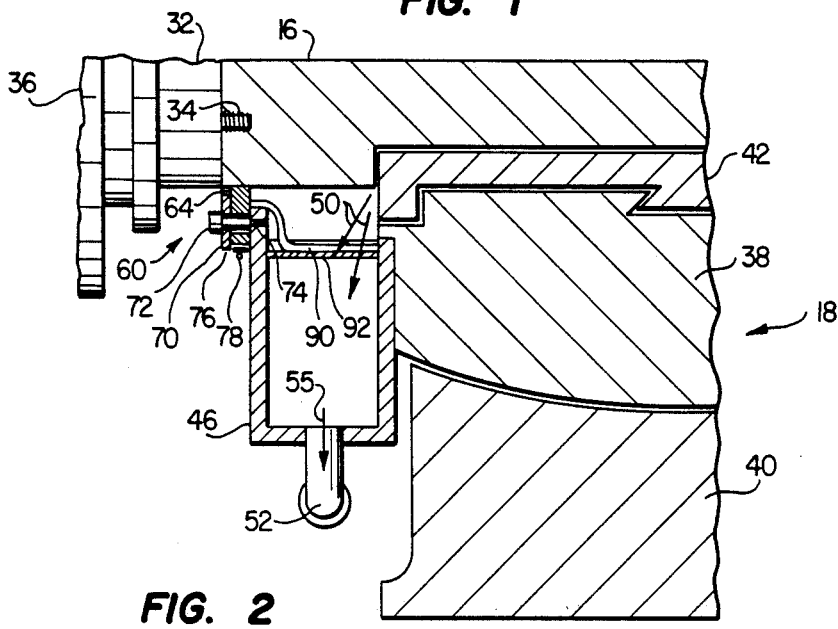
FIG. 2 is an enlarged, partially broken away sectional view of the seal assembly of FIG. 1; and, FIG. 3 is an enlarged, left end view of the seal assembly of FIG. 1 with the classifier and internal components of the trunnion removed.
Figure 3:
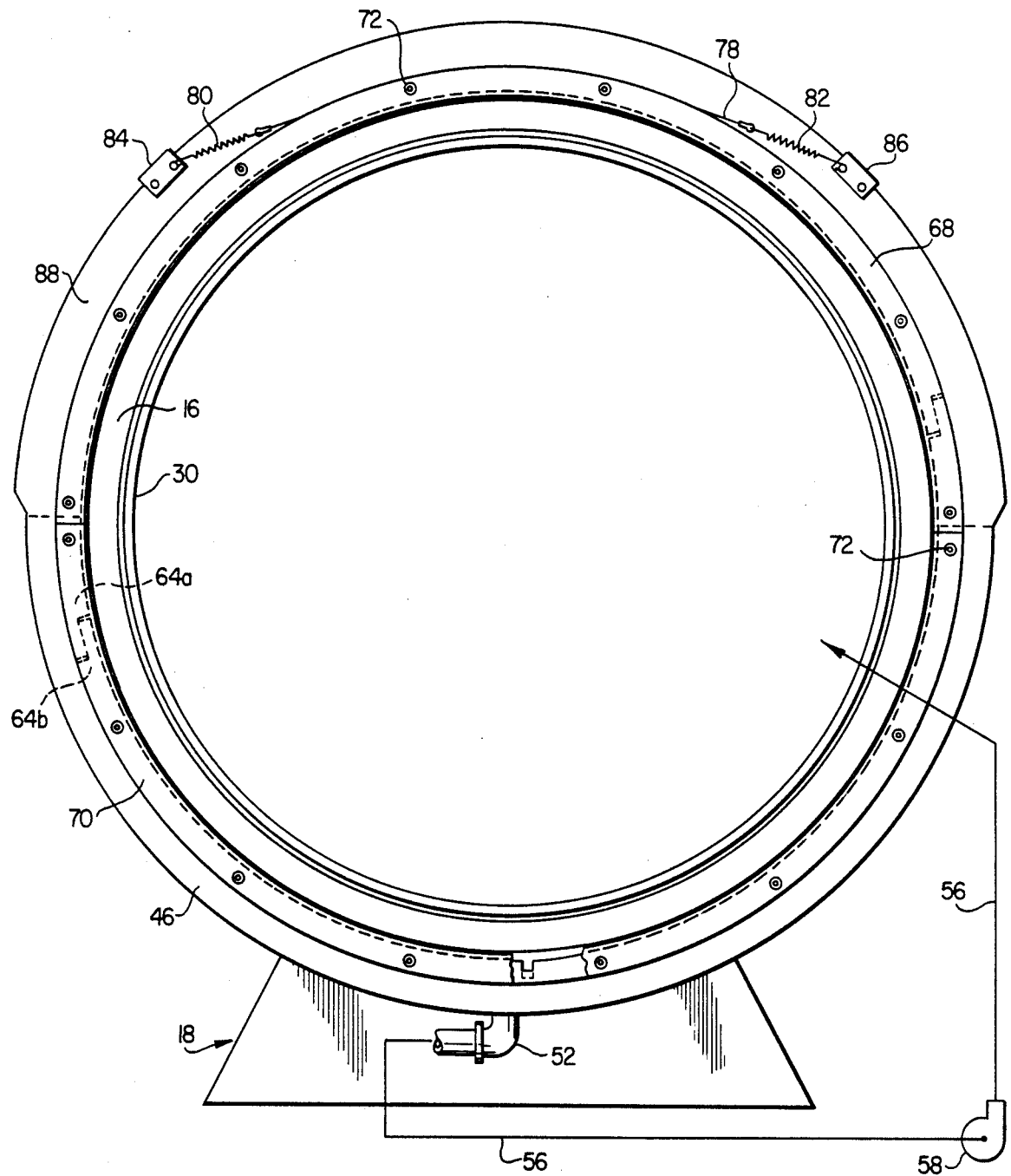

Referring now to FIGS. 2 and 3, the seal assembly 60 includes a seal ring 64 which completely encircles a shoulder of the trunnion 16 in a region adjacent to the bearing surfaces of the trunnion, the babbit 42 and the casting 38. The seal ring 64 may be constructed of an absorbent fabric material such as felt or the like. An inner radial edge of the seal ring 64 maintains surface contact with the shoulder of the trunnion 16 as the trunnion rotates. The seal ring 64 includes upper and lower halves 64a and 64b (shown in phantom in FIG. 3). The respective ends of each of the halves 64a, 64b have ship lap cuts so that the ends interfit with each other as shown in FIG. 3. In this manner, the upper and lower halves 64a, 64b may move slightly toward or away from each other to ensure surface contact with the shoulder of the trunnion 16 in spite of minor inaccuracies in the dimensions of the trunnion or the seal ring 64, or eccentricities in the trunnion which are manifested during rotation. Thus, the interfitted ends of the halves 64a, 64b prevent loss of seal integrity in the region of the ends as the upper and lower halves move relative to one another.

A retaining plate 68 (FIG. 3) holds the upper portion of the seal ring 64 in place against the bearing cap 44. Similarly, a retaining plate 70 (FIGS. 2 and 3) holds the lower portion of the seal ring 64 in place against an outer wall of the reservoir 46. The retaining plates 68, 70 extend respectively one hundred eighty degrees around the upper and lower halves of the trunnion 16 and support the seal ring 64 laterally. A plurality of spaced, threaded fasteners 72 secure the retaining plates 68, 70 respectively to the bearing cap 44 and the outer wall of the reservoir 46. The fasteners 72 are shoulder bolts which may only be tightened a limited distance into the bearing cap 44 or wall of the reservoir 46 so that the seal ring 64 is held with slight pressure but not squeezed or immobilized completely. A plurality of apertures 74 (one of which is shown in FIG. 2) are provided in the seal ring 64 for receiving the fasteners 72. The apertures 74 are oversized relative to the diameter of the fasteners 72 to also allow for limited movement of the seal ring 64. In this manner, the seal ring 64 is permitted to "float" or move slightly in a controlled space so that during eccentric rotation of the trunnion 16, the seal ring is always in surface contact with the shoulder of the trunnion.

A band 76 which is approximately the same width as the seal ring 64 circumscribes the outer diameter edge of the seal ring for biasing the seal ring against the shoulder of the trunnion 16. The ends of the band 76 overlap each other (not shown) and are free to move or slip relative to one another for slightly increasing or decreasing the effective circumference of the band around the seal ring 64 in response to gradual wear of the seal ring, eccentric movement of the trunnion and/or application of a biasing force to the band, in the manner subsequently discussed. The band 76 also provides for uniform engagement of the entire width of the seal ring 64 with the shoulder of the trunnion 16 thereby improving the seal.

A cable 78 circumscribes the entire band 76 and holds the band in place against the seal ring 64. As shown in FIG. 3, the ends of the cable 78 are attached to springs 80, 82, which are attached respectively to brackets 84, 86 which, in turn, are secured to a flange 88 of the bearing cap 44. Since the cable 78 extends more than three hundred sixty degrees around the band 76, it is understood that portions of the cable lie side-by-side (not shown) over an upper portion of the band. Tension is provided in the cable 78 by the springs 80, 82 for applying an evenly distributed biasing force to the band 76. Thus, the entire inner peripheral surface of the seal ring 64 is maintained in sealing engagement with the shoulder of the trunnion 16. Adjustment of the tension on the cable 78 is accomplished by adjusting the tension of the springs 80, 82 or by movement of one or both of the brackets 84, 86 along the circumference of the flange 88.

Referring to FIG. 2, a wick member 90 is connected to a lower portion of the seal ring 64 and extends into the reservoir 46. The wick member 90 extends for a portion of the arcuate length of the reservoir 46 and may be constructed of an absorbent material or fabric such as felt or the like and may be sewn to the seal ring 64. The end of the wick member 90 is supported in a horizontal position within the reservoir 46 by an extended trough 92. A portion of the bearing lubricant which passe by gravity from the lower portion of the babbit 42 drips onto the wick member 90. The lubricant is absorbed by capillary action through the wick member 90 into the seal ring 64. The wick member 90 continuously and automatically transmits the lubricant to the seal ring 64 thereby improving the duration and quality of the seal without the need for external lubrication or maintenance.

In operation, the drum 12, and therefore the trunnion 16 and the ring 32 rotate in the manner described previously. The seal ring 64 is biased in sealing engagement with the shoulder of the trunnion by the band 76 and the cable 78 and is supported laterally by the upper and lower retaining plates 68, 70. The seal ring 64, the band 76 and the cable 78 are free to "float" or move slightly in response to eccentric motion of the trunnion 16. The bearing lubricant is transported by the pump 58 and injected through the line 56 to the upper region of the babbit 42 to reduce the frictional forces produced by rotation of the trunnion. The lubricant circulates by gravity and by rotation of the trunnion 16 over all of the bearing surfaces between the trunnion, the babbit 42 and the bearing assembly 18. The lubricant collects in the reservoirs 46, 48 and is then recycled to the pump 58 through the return ports 52, 54. A portion of the lubricant within the reservoir 46 is absorbed by the wick member 90 and consequently the seal ring 64.

The seal assembly of the present invention, therefore, has several advantages. For example, the rigidly clamped seal ring of the prior art devices is eliminated in favor of a seal ring which is free to float axially and adjust itself to meet the shoulder of the trunnion to accommodate wear of the seal ring, and changes in alignment of the trunnion during use, as well as thermal expansion and contraction of the mill. The seal ring includes mating halves which can move toward and away from each other in response to the particular dimensions of the trunnion or eccentric movement of the trunnion, thus maintaining a proper seal while minimizing buckling, fraying and uneven wear of the seal ring material. The seal ring is also biased at its outer periphery against the trunnion by a spring loaded cable and band circumscribing the seal ring to ensure effective sealing engagement with the trunnion. The biasing force or tension placed on the seal ring may be adjusted in order to maintain a desired seal quality. Lateral support of the seal ring is provided by retaining plates without immobilizing the seal ring. The seal ring is also automatically lubricated by a bearing lubricant through a wick member to prevent drying out of the seal ring material, and reduce wear.

A latitude of modification, change and substitution is intended in the foregoing disclosure and in some instances, some features of the invention will be employed without a corresponding use of other features. Accordingly, it is appropriate that the appended claims be construed broadly and in a manner consistent with the scope of the invention.

What is claimed is:

1. A seal assembly for a rotating drum comprising a trunnion secured relative to said drum for rotation therewith, a fixed member supporting said trunnion, at least one seal ring, and means mounting said seal ring relative to said fixed member and in sealing engagement with said trunnion, said mounting means including tension means for adjustably biasing said seal ring against said trunnion, said tension means including means circumscribing the periphery of said seal ring.

2. The seal assembly according to claim 1 wherein said seal ring comprises an absorbent fabric material.

3. The seal assembly according to claim 1 wherein said means circumscribing the periphery of said seal ring includes a spring loaded cable.

4. The seal assembly according to claim 3 wherein said means further includes a band underlying said cable in surface contact with the outer diameter of said seal ring.

5. The seal assembly according to claim 4 wherein the ends of said band overlap and move relative to one another.

6. The seal assembly according to claim 1 wherein said seal ring includes two halves which interfit each other at the ends thereof.

7. The seal assembly according to claim 6 wherein said ends have ship lap cuts to permit relative movement between said halves.

8. The seal assembly according to claim 1 wherein said mounting means includes at least one retaining ring for laterally supporting said seal ring while permitting said biasing.

9. The seal assembly according to claim 8 wherein said mounting means includes a plurality of threaded fasteners connected to said fixed member for supporting said retaining ring.

10. The seal assembly according to claim 9 wherein said fasteners are shoulder bolts for supporting said retaining ring sufficiently loosely with respect to said fixed member to permit said biasing.

11. The seal assembly according to claim 9 wherein said seal ring includes a plurality of spaced apertures for receiving said fasteners, said apertures being sufficiently large to permit said biasing of said seal ring.

12. The seal assembly according to claim 1 wherein said mounting means comprises at least one reservoir secured relative to said fixed member and containing a lubricant, and means for applying said lubricant to said seal ring.

13. The seal assembly according to claim 12 wherein said means for applying said lubricant to said seal ring comprises a wick member extending between said seal ring and said reservoir.

14. The seal assembly according to claim 13 wherein said wick member is supported by a trough within said reservoir.

15. A seal assembly for a rotating drum comprising a trunnion secured relative to said drum for rotation therewith, a fixed member supporting said trunnion, at least one seal ring member for preventing dust infiltration between said trunnion and said fixed member, means mounting said seal ring member relative to said fixed member and in sealing engagement with said trunnion, means for applying a lubricant between said fixed member and said trunnion, means for collecting said lubricant for reapplication between said fixed member and said trunnion, and means for transferring a portion of said lubricant to said seal ring from said collecting means.

16. The seal assembly according to claim 15 wherein said transferring means includes a wick member extending between said seal ring and said collecting means.

17. The seal assembly according to claim 16 further comprising trough means disposed within said collecting means for supporting said wick member.

18. The seal assembly according to claim 15 wherein said means for applying a lubricant between said fixed member and said trunnion includes at least one fluid conduit extending between said collecting means and said fixed member, and a fluid pump for transporting said lubricant through said fluid conduit.

19. The sealing assembly according to claim 15 wherein said collecting means includes at least one reservoir positioned adjacent a lower portion of said trunnion.

* * * * *